Figure 1:
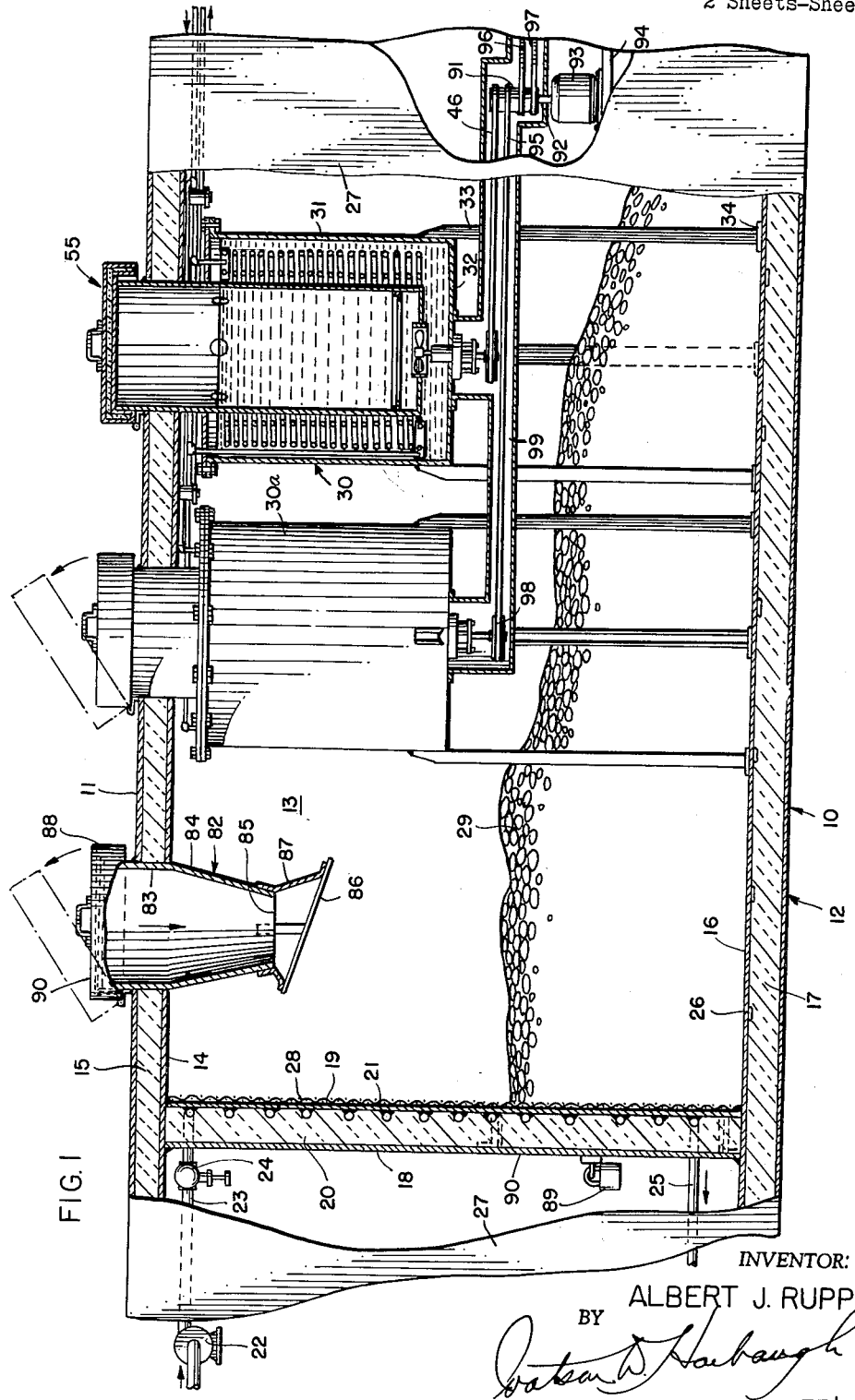

Aug. 21, 1962

A. J. RUPPEL 3,049,890

IMMERSION FREEZER

Filed Oct. 16, 1957

2 Sheets-Sheet 1

INVENTOR:
ALBERT J. RUPPEL
BY
ATT'Y

Aug. 21, 1962     A. J. RUPPEL     3,049,890
IMMERSION FREEZER
Filed Oct. 16, 1957     2 Sheets-Sheet 2

INVENTOR:
ALBERT J. RUPPEL
BY
ATT'Y

United States Patent Office 3,049,890
Patented Aug. 21, 1962

3,049,890
IMMERSION FREEZER
Albert J. Ruppel, Ciudad del Carmen, Campeche, Mexico, assignor to Booth Fisheries Corporation, Chicago, Ill., a corporation of Delaware
Filed Oct. 16, 1957, Ser. No. 690,460
15 Claims. (Cl. 62—64)

This invention relates to a product freezing structure and to a method of freezing products, and more particularly to a method of quick freezing shrimp and the like and to an immersion freezer therefor.

In catching shrimp, one procedure quite uniformly followed is for a trawling boat to sail waters inhabited by shrimp to collect a load thereof. When a suitable catch has been obtained, the trawler is returned to port for unloading, after which the shrimp are suitably processed and sent on to the consuming market. Shrimp deteriorate quite rapidly, and it is necessary to retard such spoilage by packing the catch in ice on board the trawler. This necessity limits the duration of any one fishing excursion because the ice in time melts. Thus, often it is necessary to return the trawler to port in order to preserve the catch already on board. In many instances, this seriously limits the productivity of the trip for good fishing waters, which are difficult to locate, must be abandoned at the height of the catch.

It has been found that the shrimp bacterial count increases quite rapidly even though the shrimp are packed in ice, and thus this factor in itself limits the time that can be spent on any fishing excursion irrespective of the icing capacity of the trawler. Consequently, there is a relatively high percentage of culls in each catch delivered by a trawler to port—for example, at least 5% in an 8 to 10-day trip. If an ordinary trip of this duration would net a catch of about 2,000 pounds, approximately 100 pounds would be unusable; and at the average price of shrimp today, this would amount to a loss of about $60.00 a load.

Further, the shrimp must be processed immediately at port, otherwise additional spoilage occurs. In addition, however, since the shrimp are merely chilled and not frozen, the bodies thereof are relatively soft and spongy and, consequently, are easily damaged during storage on board and in the subsequent inspection, color separation and grading thereof at port. It may be noted that increased accuracy is obtained in the grading of firm shrimp, since the larger ones thereof cannot bounce through the spaces of the graders intended only for the passage of much smaller shrimp therethrough. Moreover, there is further loss in peeling shrimp for those that enter the peeling machines after having been slowly chilled from the outside-in, have a tendency to swell and become distorted to the point that they are cut crossways by the peelers and must be discarded.

In view of these difficulties plaguing the shrimp industry, an object of this invention is to provide a handling and processing technique that overcomes these and other disadvantages. Another object of the invention is in the provision of a method for quick freezing shrimp and the like, so that each shrimp is thoroughly and completely frozen and is separated from those surrounding the same. Still another object is to provide apparatus for quick freezing shrimp and like crustaceans on board fishing boats in a manner such that each is completely frozen and does not adhere to those in adjacency, either during the freezing operation or subsequent storage thereof.

A further object of the invention is that of providing a method and apparatus for quick freezing shrimp and the like, in which a plurality of shrimp are gently agitated to afford uniform freezing throughout, but yet are positively held in close adjacency with each other to minimize space requirements on board the trawler. Additional objects and advantages of the invention will become apparent as the specification develops.

An embodiment of the invention in terms of a method and of apparatus, is illustrated in the accompanying drawings, in which—

Figure 2:
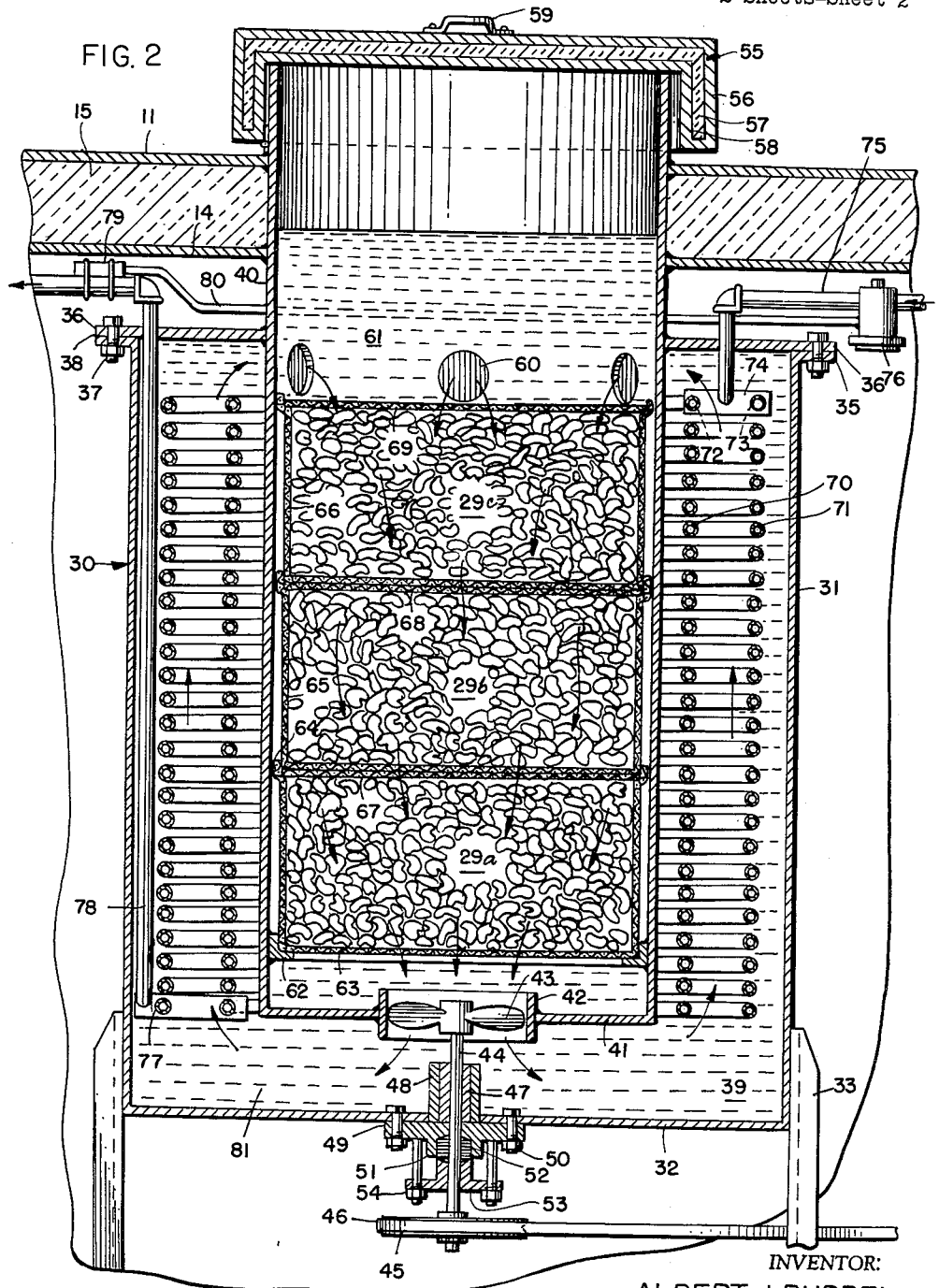

FIGURE 1 is a broken longitudinal sectional view of the hold of a trawler incorporating the invention therein; and FIGURE 2 is an enlarged, vertical sectional view of one of the immersion freezer assemblies illustrated in FIGURE 1.

The trawler partially illustrated in FIGURE 1 is denoted generally with the numeral 10, and is seen to comprise a deck 11 and a bottom 12 defining a hold 13 therebetween. Spaced from the deck 11 is an inner liner 14, and interposed therebetween is a layer of insulating material 15. Similarly, a liner 16 is spaced from the bottom wall 12, and interposed therebetween is a layer of insulation 17. The hold 13 is further defined by vertical walls or bulkheads 18, separated from inner liners 19 by insulation 20. Thus, the hold 13 is a thermally insulated compartment, much the same as the space within a domestic refrigerator.

Extending along and secured to the liners 19 is a serpentine conduit 21 comprising the expansion coils of a refrigeration system. This system may be conventional, and will have a compressor 22 connected by a condenser (not shown) and conduit 23, having an expansion valve 24 interposed therein, with the expansion coils 21 so as to deliver refrigerant thereto; and a return line 25 connected with the coils 21, returns the expanded refrigerant to the compressor 22. Preferably, the bottom liner 16 is also equipped with a conduit 26 that provides an additional expansion coil for the refrigerating system. One end of the coil 26 will be connected to the compressor 22, and the other end thereof connected to the return line 25 or directly to the condenser of the system.

The trawler 10 has the usual side walls 27, which of course will be insulated in the manner of the deck 11, bottom 12 and partitions 18. The liners 19 are preferably covered with a screen-like sheath 28 that serves to separate the mass of shrimp 29 therefrom so as to prevent adherance. In other respects, the trawler may be completely conventional and since well known, no further description thereof need be set forth.

Mounted within the hold 13 is one or more immersion freezer units 30. Two such units are illustrated in FIGURE 1; and to distinguish the second from the first, it is denoted with the numeral 30a. These units are identical, and consequently a detailed description of one will apply equally to others. The freezer comprises an outer cylindrical tank or casing 31 having a bottom wall 32 and depending legs 33, each of which has a foot or plate 34 at the lower end thereof secured to the liner 16. As shown best in FIGURE 2, the casing 31 is turned laterally at its upper end to provide an annular flange 35, having seated thereon a cover 36 rigidly secured to the flange by means of nut and bolt assemblies 37. Preferably, a gasket 38 is interposed between the flange and cover to afford a liquid-tight seal.

Mounted within the chamber or compartment 39 defined within the casing 31, is an inner tank or casing 40 having a cylindrical configuration and being of substantially smaller diameter than the outer casing 31. The lower end of the cylindrical tank 40 terminates a spaced distance above the bottom wall 32 of the outer casing, and is equipped with a bottom 41 having a central opening therethrough in which is mounted a ring 42 which forms a guard or housing for a fan or propeller 43 affixed to a shaft 44 that extends downwardly through the bottom wall 32 of the outer casing, and is equipped at its lower end with a pulley wheel 45 having an endless, generally V-shaped drive belt 46 entrained thereabout.

The projection of the shaft 44 through the bottom wall 32 is sealed by means of a bearing 47, which surrounds the shaft and may be formed of resilient material, such as rubber. The bearing 47 is contained within a bearing ring 48 that also extends through the wall, and is provided by a plate 49 clamped to the bottom wall by nut and bolt assemblies 50. Preferably, a seal will be interposed between the wall 32 and plate 49 to prevent the escape of liquid; and within a boss or box 51 provided by that plate is packing or stuffing 52 surrounding the shaft and sealingly compressed thereagainst by a packing gland 53 tightened against the stuffing by stud and nut combinations 54.

The inner casing 40 is substantially longer than the outer casing 31, and extends upwardly through the top wall 38 thereof and is rigidly secured thereto in any suitable manner, such as by welding as illustrated. The inner casing also extends upwardly through the liner 14, insulation 15 and deck 11, and is welded or otherwise secured to the deck and liner. At its upper end, which projects beyond the deck 11, the casing 40 is equipped with a cover 55 comprising an outer shell 56, separated by insulation 57 from an inner liner 58. The cover 55 is provided along the upper surface thereof with a handle 59 to facilitate removal and placement of the cover in closing relation with the top of the cylinder 40.

The inner casing, intermediate the ends thereof and adjacent the cover 36 of the outer casing, is provided with a plurality of ports or openings 60 to communicate the chamber or compartment 61 defined within the inner casing with the compartment 39 defined within the interior of the outer casing 31. As will be described in detail hereinafter, the ports 60 permit the flow of liquid into the compartment 61. Secured to the inner wall of the casing 40, adjacent but spaced from the bottom wall 41 thereof, are a plurality of support brackets 62 adapted to receive thereon a basket 63, formed of screening or wire or that is otherwise perforate to permit the free flow of liquid therethrough. The basket 63 is enlarged at its upper end, as shown at 64, so as to nestingly seat therein the bottom-most portion of a second basket 65 which is identical with the first described, and consequently affords a support for a third basket 66 of identical construction. Preferably, the baskets have covers (denoted 67, 68 and 69, respectively), and are adapted to receive the catches of shrimp therein which, for identification, are indicated by numerals 29a, 29b and 29c.

Mounted within the outer casing 31, and in circumjacent relation with the inner casing 40, are inner and outer coaxial coils 70 and 71, respectively, forming the evaporator of a primary refrigerant system. Compressed refrigerant is fed to the coils 70 and 71 through connections 72 and 73 thereof with a manifold 74, communicating with a supply conduit 75 having a thermostatic expansion valve 76 interposed therein. Expanded refrigerant is taken from the coils 70 and 71 through a manifold 77 communicating therewith, which feeds into a suction line 78.

It will be evident that the delivery line 75 and suction line 78 will be connected, into a refrigeration system having a compressor and condenser and for this purpose they could be connected, if desired, into the system heretofore referred to having the compressor 22 therein. The valve 76 is controlled through a temperature sensing element that communicates therewith through a capillary tube 80 and includes a bulb 79 clamped to suction line 78. The valve and thermostat 79 therefor may be conventional, and comprise simply an expansible fluid system which controls a closure member regulating the flow of compressed refrigerant through the line 75.

Preferably, the refrigeration coils are kept flooded and the temperature of the brine is controlled by suction pressure regulating valve which maintains an evaporating pressure within the coils of 6.28 pounds per square inch at which pressure boiling or evaporation of Freon-12 is limited to —6° F. in order to avoid freezing the brine.

Circulating about the coils 70 and 71 is a liquid medium 81 which forms a secondary refrigerating system, and may be a brine solution or a brine and dextrose mixture. The connection of the coils 70 and 71 to the refrigeration supply line, indicates that the flow of refrigerant therethrough will be from top to bottom, or in a counter-flow relation with the movement of the brine solution over the coils, which is from bottom to top as shown by the arrows in FIGURE 2.

Referring now to FIGURE 1, it will be apparent that in addition to the immersion freezer units 30 and 30a, a feed assembly 82 will also extend through the deck 11. The purpose of this arrangement is to permit frozen shrimp to be dumped into the hold 13. This assembly comprises a generally cylindrical conduit 83 having an inverted frusto-conical end portion 84 terminating in an open end 85, having an angularly disposed chute 86 therebelow and secured thereto through straps 87. The upper end of the conduit 83 is open, and is adapted to be closed by a cover 88 which is preferably insulated in the manner of the cover 55 described hereinbefore.

It will be noted that the chute 86 inclines downwardly toward the immersion freezer units, so that there is a tendency for the shrimp to slide toward the right as viewed in FIGURE 1, for the purpose of uniformly distributing the shrimp throughout the hold 13. Also, it may be noted that the space between the open end 85 of the conduit and the chute 86, is relatively small and preferably is small enough to prevent a man from entering the hold through the conduit. This requirement is desired as a means for preventing theft of shrimp from the hold, which is a serious problem in the industry. For this same purpose, it is desired to provide a lock 89 for the door 90 in the bulkhead 18, through which the hold is emptied when the trawler is in port. It may be noted that the refrigerant coils 21 along the liner 19 of the bulkhead can be omitted throughout the door section thereof, or included by the provision of appropriate connections that permit the door to swing open and closed without disturbing the continuity of the coils.

FIGURE 1 also shows that the endless belt 46, which at one end is entrained about the pulley 45 for rotating the fan 43, is entrained at its other end about a pulley 91 secured on the shaft 92 of a motor 93 bolted or otherwise secured to a support 94 therefor provided within the hold 13. The pulley 91 is a relatively long member, having a plurality of spaced apart, parallel grooves or channels formed therein so as to accommodate a plurality of belts such as those denoted with the numerals 95, 96 and 97. It will be apparent that the belt 95 engages a pulley wheel 98 connected to the fan-equipped shaft of the immersion unit 30a. The belts 96 and 97, if they are provided, may extend to any additional immersion freezer units with which the trawler may be equipped. Preferably, a guard 99 encloses the belts 46 and 95 and movable parts associated therewith, so as to separate them from the contents of the hold 13.

In use, the temperature within the hold 13 will ordinarily be kept at about zero to $+5°$ F. by the refrigerating system therefor. The hold, of course, is large enough to receive several thousand pounds of shrimp, and the refrigerating system will have a capacity such that these large quantities of shrimp will be maintained at the stated temperature. Since the immersion units 30 and 30a are contained within the hold 13, it is unnecessary that they be insulated for the temperatures therein will never be substantially lower than the temperature of the hold. Before the inner casing 40 is filled with baskets of shrimp, the liquid level of the brine solution will come to about the midpoints of the ports 60. When the motor 93 is energized to rotate the fan or propeller 43, a continuous circulation of liquid is then enforced downwardly through the inner casing 40, upwardly through the outer casing 31, and over the refrigerating coils 70 and 71.

Each of the baskets is adapted to receive approximately twenty-five pounds of shrimp therein; and as fast as shrimp are caught and taken aboard the trawler, they are dumped into the baskets which are then placed within the casing 40 through the upper end thereof. It will be apparent that one to three baskets may be placed within the inner casing 40 at any time, and it is not essential that the baskets hold twenty-five pounds each or even be filled to capacity. Ordinarily, the cover 55 will be replaced over the open end of the casing 40 after the baskets are deposited therein and supported in the stacked relation shown, with the lowermost basket supported on the L-shaped brackets 62. The shrimp-filled baskets remain in the casing 40 until the shrimp have been frozen, and the precise time will depend primarily upon the size of the individual shrimp and the weight load thereof. Usually, this will take from five to ten minutes when the inner casing is completely loaded; and if a standard freezing time is desired, it might be set at fifteen minutes which would provide ample leeway.

After the freezing time has elapsed, the cover 55 is removed and the baskets taken from the casing, and the contents thereof immediately dumped into the hold 13 through the conduit 83. Preferably, the temperature maintained within the casings 31 and 40 is substantially the same as that maintained within the hold 13, or specifically, from zero to +5° F. The thermostat 79 and valve 76 controlled thereby function to prevent the temperature of the brine solution 81 from falling below the stated range. When the casing 40 is filled with shrimp, as shown in FIGURE 2, the liquid therein will rise to approximately the level illustrated in that figure.

The shrimp baskets are perforate and thus permit the free flow of brine solution therethrough; and the flow is through the ports 60 and downwardly through the baskets and shrimp therein, as enforced by the fan or propeller 43. From the fan, the flow is upward through the outer casing 31 and then into the casing 40 through the ports. As stated before, the flow of refrigerant through the coils 70 and 71 is a counter-flow with respect to the upwardly directed flow of brine through the tank 31. Since the inner and outer tanks or casings are cyclindrical, an even or uniform circulation is afforded therethrough so that all areas within the container 40 receive substantially the same degree of cooling. There is considerable boiling or frothing of the brine during freezing of the shrimp, but all of such foam is well above the shrimp mass and also above the ports 60. Thus, the foam does not interfere with the uniform movement of the liquid.

The brine solution is made relatively dense so that the shrimp are buoyant with respect thereto and tend to rise within the tank 40, and more particularly within the individual baskets therefor, and they are not packed so tightly in each basket as to prevent such movement. Consequently, the downward movement of the liquid through the shrimp agitates them slightly; and since they tend to separate because of this buoyancy, the cooled circulating brine intimately contacts all surfaces of each shrimp, effecting a rapid extraction of heat therefrom so that they are quickly frozen. Furthermore, the downward flow of the brine counteracts the buoyancy of the shrimp and urges the mass downwardly within the casing and baskets therein. Thus, a method of quick freezing the shrimp is defined by the relationships described.

The shrimp are quick frozen so that there is substantially no deterioration thereof between the time they are pulled from the water and deposited for storage in the hold 13. Moreover, they are maintained in this frozen state while within the hold; and the length of each excursion is no longer dependent upon the condition of the shrimp, but solely upon external factors, such as the capacity of the trawler, sailing schedules, etc. Additionally, the shrimp are individually frozen and thus are separated one from another while within the hold and thereafter during the processing thereof in port. Not only are the shrimp undamaged by the storage thereof within the hold, but they are not damaged by removal therefrom because of their hard, frozen state. This condition persists throughout substantially all of the processing thereof in port, although there is a slight thawing of the outer surfaces thereof during their passage through washing tanks and the movement thereof along the inspection belt. This slight thawing is advantageous since it facilitates the handling thereof by the mechanical graders and peelers.

Furthermore, much less ice is required in packing the shrimp for shipment because they are still partially frozen. Ultimately, there is less spoilage of the shrimp from the time they are caught until they reach the consumer, and consequently there is less odor, the bacterial count is much less, and the market value thereof is greater than shrimp processed in the conventional manner. It is believed that the savings resulting from reduction in the culls will in just a few months, pay for the system described herein.

While in the foregoing specification an embodiment of the invention has been described in considerable detail both with reference to a method and to apparatus, for purposes of amply disclosing the same, it will be apparent to those skilled in the art that numerous changes may be made in those details without departing from the spirit and principles of the invention.

I claim:

1. In an immersion freezer unit for a trawler, an outer tank closed at its bottom and defining a chamber therein below the deck of the trawler, a top closure for said outer tank open throughout a central portion thereof, an inner tank of smaller cross section extending through said opening in sealing relation therewith to provide a portion thereof extending into said chamber and another portion thereof extending upwardly from said outer tank and through said deck, said inner tank being provided with a plurality of openings therein adjacent said top closure but within said chamber to communicate the interior of said inner tank therewith, an evaporator for a refrigeration system mounted within said chamber whereupon liquid filling the same is cooled by said evaporator, and means for enforcing a flow of such fluid downwardly through said inner tank and upwardly through said chamber for recirculation into said inner tank through said openings.

2. The freezer unit of claim 1 in which said means comprises a propeller mounted adjacent the lower end of said inner tank, and means for rotating said propeller.

3. In combination, a pair of generally coaxial inner and outer casings defining respecitvely a product freezing chamber and a refrigerating chamber, said inner casing extending upwardly beyond said outer casing and being provided with a plurality of openings therein establishing communication between said chambers adjacent the upper portions thereof, said outer casing being closed at its bottom and also at its top about said inner casing, flow directing means positioned adjacent the lower end of said inner casing for causing liquid within said chambers to flow downwardly through said freezing chamber and upwardly through said cooling chamber, and refrigerant coils mounted within said cooling chamber in generally surrounding relation with said inner casing for chilling such liquid in the flow thereof upwardly through the cooling chamber.

4. The combination of claim 3 in which said casings are generally cylindrical, and in which said refrigerant coils are circumjacent said inner casing and extend along the longitudinal axis thereof.

5. The combination of claim 4 in which the flow of refrigerant through said coils is in a counterflow relation with respect to the upward movement of liquid through said cooling chamber.

6. The combination of claim 3 in which said flow directing means comprises a rotatably driven propeller.

7. In an immersion freezer for shrimp and the like, an outer casing closed at its top and bottom and defining a cooling chamber therein, coolant coils mounted within said chamber and being adapted to be connected to a refrigerating system to define the evaporator therefor, an inner casing extending through the upper end closure of said outer casing and defining a shrimp freezing chamber therein, said inner casing having a plurality of openings therein adjacent the upper end of said outer casing to provide for the free flow of liquid from said cooling chamber and into said freezing chamber, a bottom closure for said inner casing spaced from the lower end of said outer casing and having an opening disposed therein permitting the flow of fluid therethrough, a fan mounted within such last mentioned opening for enforcing a flow of fluid therethrough from said freezing to said cooling chamber, and means for rotating said fan.

8. The structure of claim 7 in which said outer casing is filled with a liquid refrigerant, the specific gravity of said liquid being greater than that of shrimp ordinarily immersed within said liquid in the freezng chamber whereby such shrimp tend to float therein but are forced downwardly by the flow of said liquid through the refrigerating chamber.

9. The combination of claim 8 in which said inner casing is equipped with supports adjacent the lower end thereof adapted to receive shrimp baskets thereon.

10. In combination with a trawler having a deck and a refrigerated hold therebelow, an outer casing closed at its top and bottom and defining a cooling chamber therein, coolant coils mounted within said chamber and being adapted to be connected to a refrigerating system to define the evaporator therefor, an inner casing extending through the upper end closure of said outer casing and defining a shrimp freezing chamber therein, said inner casing having a plurality of openings therein adjacent the upper end of said outer casing to provide for the free flow of liquid from said cooling chamber and into said freezing chamber, a bottom closure for said inner casing spaced from the lower end of said outer casing and having an opening disposed therein permitting the flow of fluid therethrough, a fan mounted within said last mentioned opening for enforcing a flow of fluid therethrough from said freezing to said cooling chamber, and means for rotating said fan, said inner and outer casings being mounted within said hold with the upper end portion of said inner casing extending through said deck to afford access to the interior thereof.

11. The structure of claim 10 in which said outer casing is filled with a liquid refrigerant, the specific gravity of said liquid being greater than that of shrimp ordinarily immersed within said liquid in the freezing chamber, whereby such shrimp tend to float therein but are forced downwardly by the flow of said liquid through the refrigerating chamber.

12. The combination of claim 11 in which said inner casing is equipped with supports adjacent the lower end thereof adapted to receive shrimp baskets thereon.

13. The combination of claim 11 in which said coils are circumjacent said inner casing and extend longitudinally therealong, the flow of refrigerant through said coils being in counter-flow relation with the movement of liquid through said cooling chamber.

14. In combination with a trawler having a deck and a refrigerated hold therebelow, an outer casing closed at its top and bottom and defining a cooling chamber therein, coolant coils mounted within said chamber and being adapted to be connected to a refrigerating system to define the evaporator therefor, an inner casing extending through the upper end closure of said outer casing and defining a shrimp freezing chamber therein, said inner casing having a plurality of openings therein adjacent the upper end of said outer casing to provide for the free flow of liquid from said cooling chamber and into said freezing chamber, a bottom closure for said inner casing spaced from the lower end of said outer casing and having an opening disposed therein permitting the flow of fluid therethrough, a fan mounted within said last mentioned opening for enforcing a flow of fluid therethrough from said freezing to said cooling chamber, means for rotating said fan, said inner and outer casings being mounted within said hold with the upper end portion of said inner casing extending through said deck to afford access to the interior thereof, a cover-equipped conduit extending through said deck and into said hold therebelow, and an angularly disposed chute located beneath said conduit for guiding material conveyed through the conduit in a predetermined direction with respect to the hold and defining a restricted passage with said conduit for limiting the size of material passable therethrough into the hold.

15. In a method of quick freezing shrimp and the like, the steps comprising submerging a catch of shrimp in a confined body of liquid refrigerant, forcing said shrimp to rise within the refrigerant by maintaining the specific gravity of the refrigerant at a value causing the shrimp to be buoyant, retaining the shrimp below a predetermined level in the body of the refrigerant, directing the body of liquid refrigerant to flow downwardly through the catch of shrimp at a velocity sufficiently great to counteract the buoyancy of the shrimp to maintain same in a submerged condition and agitate the catch of shrimp with sufficient turbulence to assure separation of the shrimps and absorb heat therefrom over their entire surface area, withdrawing liquid refrigerant from said body of liquid refrigerant at a level below the shrimp catch and conducting the withdrawn liquid over refrigeration coils to remove therefrom heat absorbed thereby from the shrimp and returning the withdrawn liquid refrigerant to said body of liquid refrigerant at said predetermined level continuously until said shrimp have attained the desired frozen state.

References Cited in the file of this patent

UNITED STATES PATENTS

| | | |
|---|---|---|
| 1,129,716 | Ottesen | Feb. 23, 1915 |
| 1,388,295 | Petersen | Aug. 23, 1921 |
| 1,801,548 | Fisher | Apr. 21, 1931 |
| 1,805,354 | Birdseye | May 12, 1931 |
| 1,931,623 | Robertson | Oct. 24, 1933 |
| 2,188,839 | Markley | Jan. 30, 1940 |
| 2,346,459 | Schill | Apr. 11, 1944 |
| 2,428,679 | Oehler | Oct. 7, 1947 |
| 2,470,551 | Fish | May 17, 1949 |
| 2,546,417 | Anglin | Mar. 27, 1951 |
| 2,738,749 | Macy | Mar. 20, 1956 |
| 2,746,272 | Carpenter | May 22, 1956 |